(12) United States Patent
Hering et al.

(10) Patent No.: US 11,309,562 B2
(45) Date of Patent: Apr. 19, 2022

(54) METHOD FOR OPERATING A FUEL CELL DEVICE

(71) Applicant: Robert Bosch GmbH, Stuttgart (DE)

(72) Inventors: Martin Hering, Uechtelhausen (DE); Stefanie Wahl, Freiberg am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 16/644,609

(22) PCT Filed: Aug. 9, 2018

(86) PCT No.: PCT/EP2018/071585
§ 371 (c)(1),
(2) Date: Mar. 5, 2020

(87) PCT Pub. No.: WO2019/048173
PCT Pub. Date: Mar. 14, 2019

(65) Prior Publication Data
US 2021/0066738 A1 Mar. 4, 2021

(30) Foreign Application Priority Data

Sep. 5, 2017 (DE) ..................... 10 2017 215 551.5

(51) Int. Cl.
*H01M 8/0612* (2016.01)
*H01M 8/04089* (2016.01)
(Continued)

(52) U.S. Cl.
CPC ..... *H01M 8/0618* (2013.01); *H01M 8/04097* (2013.01); *H01M 8/04761* (2013.01); *H01M 8/04776* (2013.01); *H01M 8/04828* (2013.01)

(58) Field of Classification Search
CPC ........... H01M 8/0618; H01M 8/04097; H01M 8/04761; H01M 8/04776; H01M 8/04828
See application file for complete search history.

(56) References Cited

U.S. PATENT DOCUMENTS

2012/0268079 A1 10/2012 Nakamura
2016/0006063 A1* 1/2016 Knight .................. H01M 8/249
429/425
(Continued)

FOREIGN PATENT DOCUMENTS

DE 102009055053 A1 6/2011
DE 102013221618 4/2015
(Continued)

OTHER PUBLICATIONS

International Search Report for Application No. PCT/EP2018/071585 dated Nov. 21, 2018 (English Translation, 2 pages).

*Primary Examiner* — Stewart A Fraser
(74) *Attorney, Agent, or Firm* — Michael Best & Friedrich LLP

(57) ABSTRACT

The invention relates to a method for operating a fuel cell device (10), wherein the fuel cell device (10) is operated in accordance with a quality characteristic of a fuel that is used. According to the invention, the quality characteristic is determined from a partial analysis of the constituents of the fuel that is used. The invention further relates to a fuel cell device (10) that is operated by means of such a method.

10 Claims, 2 Drawing Sheets

(51) Int. Cl.
H01M 8/04746 (2016.01)
H01M 8/04828 (2016.01)

(56) References Cited

U.S. PATENT DOCUMENTS

2017/0155162 A1\* 6/2017 Zheng .................. C10G 5/06
2018/0006317 A1\* 1/2018 Kani ................ H01M 8/04328

FOREIGN PATENT DOCUMENTS

| DE | 102013224884 A1 | 6/2015 |
| DE | 102014205499 | 10/2015 |
| DE | 102015217533 A1 | 3/2017 |
| EP | 2284982 A1 | 2/2011 |
| EP | 2866288 | 4/2015 |
| WO | 0240992 | 5/2002 |
| WO | 2012069693 | 5/2012 |
| WO | 2015082193 A2 | 6/2015 |

\* cited by examiner

METHOD FOR OPERATING A FUEL CELL DEVICE

BACKGROUND OF THE INVENTION

The present invention relates to a method for operating a fuel cell device, wherein the fuel cell device is operated in accordance with a quality characteristic of a fuel which is used.

DE 10 2013 221 618 A1 discloses a method for operating a fuel cell device, with at least one fuel cell unit, wherein a reformer unit and/or the fuel cell unit are/is operated in accordance with a detected quality characteristic of a natural gas which is used.

SUMMARY OF THE INVENTION

By contrast, the present invention has the advantage that the quality characteristic is determined from a partial analysis of the constituents of the fuel which is used. The fuel cell device can thereby be efficiently controlled without the fuel which is used being fully analyzed.

It is thus preferred that the fuel cell device has at least one reformer unit and/or at least one fuel cell unit, wherein the at least one reformer unit and/or the at least one fuel cell unit are/is operated depending on the quality characteristic of the fuel which is used, as a result of which the control can take place in a targeted manner.

The quality characteristic preferably corresponds to a number of potentially releasable electrons per molecule of the fuel which is used, in particular to an electron configuration, as a result of which a meaningful quality characteristic can be made available for controlling the fuel cell device.

In an advantageous manner, in order to control the fuel cell device, set points are specified, wherein a first set point corresponds to a ratio between oxygen and carbon, a second set point corresponds to a fuel efficiency rating and/or a third set point corresponds to an electrical current value, as a result of which particularly precise and effective control is made possible.

In an advantageous embodiment, the fuel cell device has an exhaust gas return, wherein an exhaust gas return rate is controlled in accordance with the quality characteristic and in particular in accordance with the first, second and/or third set point, as a result of which a mixture of fuel which is used and returned exhaust gas can be set in a targeted manner for effective control.

In a further advantageous embodiment, the fuel cell device has a water supply, wherein a water supply rate is controlled in accordance with the quality characteristic, and in particular in accordance with the first, second and/or third set point, as a result of which a mixture of fuel which is used and supplied water, in particular water vapor, can be set in a targeted manner for effective control.

The invention also relates to a fuel cell device which is operated by a method as claimed in the preceding description.

BRIEF DESCRIPTION OF THE DRAWINGS

Exemplary embodiments of the invention are illustrated schematically in the drawings and explained in more detail in the description below. In the drawings

DETAILED DESCRIPTION

Figure 1:
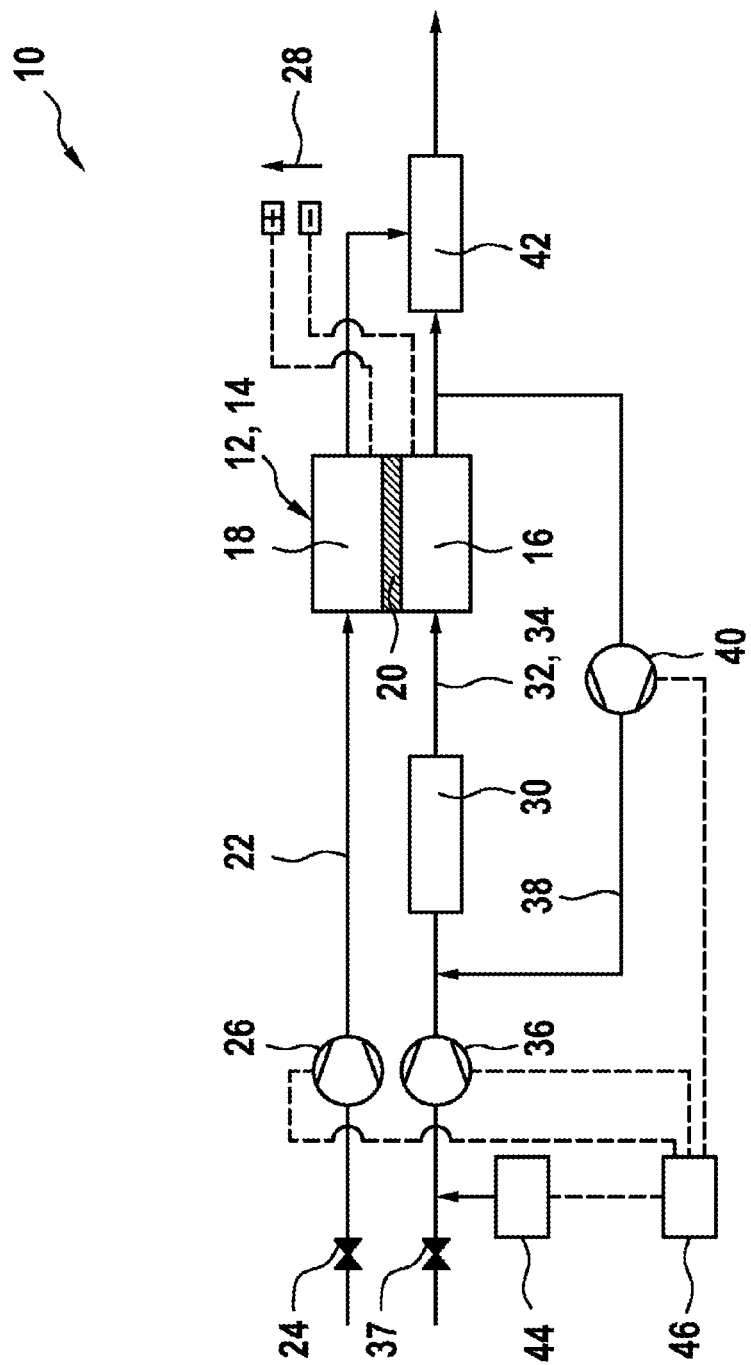
FIG. 1 shows a schematic illustration of an exemplary embodiment of a fuel cell device.

FIG. 1 shows a schematic illustration of an exemplary embodiment of a fuel cell device 10. The fuel cell device 10 has a fuel cell unit 12. In the exemplary embodiment shown, the fuel cell unit 12 has a fuel cell 14 for providing electrical energy. Alternatively, it is, however, also conceivable for the fuel cell unit 12 to have a multiplicity of fuel cells 14 which, for example, form a fuel cell stack. Similarly, it would also be conceivable for the fuel cell unit 12 to have a multiplicity of fuel cell stacks.

In the case shown, the fuel cell is a solid oxide fuel cell (SOFC). Alternatively, it would, however, also be conceivable to use a different cell technology such as, for example, a polymer electrolyte fuel cell (PEFC), a molten carbonate fuel cell (MCFC) and/or a phosphoric acid fuel cell (PAFC).

The fuel cell has an anode 16 and a cathode 18. An electrolyte 20 is arranged between the anode 16 and the cathode 18. The anode 16 is separated from the cathode 18 by the electrolyte 20.

The cathode 18 of the fuel cell unit 12 can be supplied via a feed line 22 with an oxidizing agent, in particular air or oxygen. The oxidizing agent is introduced via a valve 24 and compressed by means of a compressor 26.

In order to provide electrical energy or generate an electrical voltage 28, the fuel cell unit 12 furthermore has to be supplied at the anode 16 with a fuel-containing synthesis gas, in the case shown with a hydrogen-containing synthesis gas. In order to produce a fuel-containing synthesis gas, a reformer unit 30 is connected upstream of the fuel cell unit 12. The reformer unit 30 is connected to the fuel cell unit 12 or to the anode 16 of the fuel cell 14 via a fluid connection 32. For this purpose, the fluid connection 32 comprises a pipe 34.

In order to produce the synthesis gas containing fuel gas, the reformer unit 30 is supplied with a mixture of natural gas and a further reactant, in particular oxygen and/or water vapor, which is converted into the synthesis gas containing fuel gas by reformation, here by vapor reformation. The natural gas is compressed by a compressor 36 and supplied to the fuel cell device 10 via the valve 37. Downstream of the compressor 36, water, in particular in the form of water vapor, is added as a further reactant to the natural gas.

In the exemplary embodiment shown in FIG. 1, the fuel cell device has an exhaust gas return 38 by which water as a further reactant is added to the natural gas. The exhaust gas return 38 is thus provided to at least partially return exhaust gas, in the case shown anode exhaust gas, to the mixture with the natural gas and the further reactant, in the case shown water, or water vapor. The exhaust gas return 38 is thus an anode exhaust gas return. For this purpose, the exhaust gas return 38 has a compressor 40 which is provided for returning exhaust gas to the reformer unit 30. As a result, water vapor from a reaction operation in the fuel cell unit 12 can be used for the reformation of natural gas. During the reformation, long-chain alkanes are completely reformed. By contrast, methane is partly reformed in the reformer unit 30 and partly in the fuel cell unit 12. Furthermore, unused synthesis gas can be returned to the fuel cell, which increases a fuel efficiency rating of the fuel cell device 10.

The various alkanes of the natural gas are conducted together with the water vapor into the reformer unit 30 and reformed there. A general reaction equation for the reformation is:

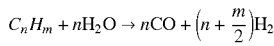

It can be seen from the formula that the mixture of alkanes and water vapor is converted into a synthesis gas containing carbon monoxide and hydrogen. Further possible constituents of the natural gas, such as in particular nitrogen, oxygen and/or carbon dioxide, can pass through the reformer unit 30 without a reaction.

Furthermore, the fuel cell device has an afterburner 42 which additionally combusts exhaust gases from the fuel cell unit 12. In this case, fuel which has remained from the anode exhaust gas of the fuel cell unit 12, as a rule hydrogen and carbon monoxide and any remaining alkanes, reacts with oxygen which is located in the cathode exhaust gas. A hot combustion exhaust gas emerges from the burner 42 and can be used, for example, for heating service water and/or heating water in a building.

For optimized reformation, a different quantity of water vapor is required depending on the composition of the natural gas. The concentrations in the synthesis gas are likewise dependent on the composition of the natural gas which is used. It is thus of advantage to detect the quality of the fuel which is used, or of the natural gas which is used, thus permitting effective control of the fuel cell device.

Accordingly, the fuel cell device 10 has an analysis unit 44 which is provided to detect a quality characteristic of the natural gas in an operating state. As explained in the stated prior art, said quality characteristic can result via determination of the calorific value or a complicated analysis of all of the constituents of the fuel which is used, in order to permit as precise a control of the fuel cell device 10 as possible.

By contrast, the present method for operating the fuel cell device 10 now has the advantage that the quality characteristic is determined merely from a partial analysis of the constituents of the fuel which is used, as a result of which a full analysis of all of the constituents of the fuel which is used, or of the natural gas which is used, is no longer necessary.

The reformer unit 30 and the fuel cell unit 12 are thus operated in accordance with the quality characteristic of the fuel which is used, or of the natural gas which is used.

The quality characteristic corresponds here to a number of potentially releasable electrons per molecule of the fuel which is used, said number being referred to below as the electron configuration $K_{e^-}$.

It is assumed here that the natural gas consists of 4 electrochemically active main species, here of the alkanes methane ($CH_4$), ethane ($C_2H_6$), propane ($C_3H_8$) and butane ($C_4H_{10}$). Alternatively, it would, however, also be possible to assume a different number of main species.

During the operation of the present fuel cell device 10, only the electrochemically active substances in the fuel are used for determining the electron configuration. Within the context of the present invention, when natural gas is used as the fuel, the electron configuration $K_{e^-}$ can be described as follows:

$$K_{e^-} = 8x_{CH_4} + 14x_{C_2H_6} + 20x_{C_3H_8} + 26x_{C_4H_{10}},$$

wherein $x_{C_nH_{2n+2}}$ (where n=1, 2, 3, 4, . . . ) means the substance quantity of the electrochemically active alkanes.

Thus, according to the invention, in order to determine the electron configuration as the quality characteristic, only a partial analysis of the fuel, or of the natural gas, is carried out by the analysis unit 44 merely carrying out an analysis of a certain number of substance quantities of electrochemically active substances which do not correspond to the entire number of substances located in the fuel. Accordingly, in order to determine the electron configuration $K_{e^-}$, not all of the constituents of the fuel which is used are detected, and therefore a simplified operation of the fuel cell device 10 is made possible.

In the exemplary embodiments which are shown, in order to detect said substance quantities of the fuel, use is made of a gas chromatograph which is provided to analyze the fuel, or the natural gas, in respect of said substances. The detected values are then transmitted to a control unit 46 which then determines the electron configuration $K_{e^-}$ as the quality characteristic. Alternatively, it would also, however, be possible for the electron configuration $K_{e^-}$ to be determined by means of the analysis unit 44, whereupon the electron configuration $K_{e^-}$ is transmitted as the value to the control unit 46.

In order to control the fuel cell device 10, set points are specified to the control unit 46, wherein a first set point corresponds to a ratio $\Phi$ between oxygen and carbon, a second set point to a fuel efficiency rating $U_{f,S}$ and a third set point corresponds to an electrical current value I. The current value I corresponds to the current which is produced by the fuel cell unit 12 and can therefore also be understood as the current value I of the fuel cell unit 12. Specification of said set points $\Phi$, $U_{f,S}$ and I makes it possible for the fuel cell device 10 to be controlled in a targeted and therefore also effective manner, wherein the values do not have to be detected by measurement technology.

On the basis of the determined electron configuration $K_{e^-}$ and the predetermined set points $\Phi$, $U_{f,S}$ and I, finally the volumetric flows within the fuel cell device are controlled by means of the control unit 46.

In the exemplary embodiment shown in FIG. 1, the exhaust gas return rate $r_A$ is in accordance with the quality characteristic, or the electron configuration $K_{e^-}$, and the first, second and third set point. The exhaust gas return rate $r_A$ corresponds here to the percentage portion of the anode exhaust gas which is returned by means of the exhaust gas return 38.

In order to control the flow in the exhaust gas return 38, the exhaust gas return rate $r_A$ in the control unit 46 is determined by the following formula:

$$r_A = \left(U_{f,S}\left(\frac{K_{e^-}}{2f(K_{e^-}, \Phi)} - 1\right) + 1\right)^{-1},$$

wherein $f(K_{e^-}, \Phi)$ can be understood as meaning the coefficient of natural gas and constitutes a function which has primarily been determined from a regression of empirically measured natural gas data and depends exclusively on the electron configuration $K_{e^-}$ and the oxygen to carbon ratio $\Phi$. The exhaust gas return rate $r_A$ can thus be determined exclusively depending on the determined electron configuration $K_{e^-}$ and the specified set points $\Phi$, $U_{f,S}$ and I, as a result of which simplified control of the fuel cell device 10 is made possible.

Accordingly, the compressor 40 of the exhaust gas return 38 is controlled via its rotational speed in such a manner that the exhaust gas return rate $r_A$ is set. This can also be understood as meaning that the volumetric flow $\dot{V}_r$ in the exhaust gas return 38 is determined and correspondingly set exclusively in accordance with the specific electron configuration $K_{e^-}$ and the specified set points $\Phi$, $U_{f,S}$ and I. The functional relationship of the volumetric flow $\dot{V}_r$ to said variables $K_{e^-}$, $\Phi$, $U_{f,S}$ and I can be described as follows:

$$\dot{V}_r = f(U_{f,S}, \Phi, I, K_{e^-})$$

Alternatively, volumetric flows can also be determined and correspondingly set at other locations of the fuel cell device 10, specifically at locations of the anode-side flow guide of the fuel cell device 10, exclusively in accordance with the certain electron configuration $K_{e^-}$ and the specified set points $\Phi$, $U_{f,S}$ and I. The same functional relationship as for the volumetric flow $\dot{V}_r$ in the exhaust gas return 38 are present here.

Possible locations of the fuel cell device 10 at which such a control can take place would be, for example, the following: upstream of the mouth of the exhaust gas return 38; downstream of the mouth of the exhaust gas return 38 and upstream of the reformer unit 30; downstream of the reformer unit 30 and upstream of the fuel cell unit 12; downstream of the fuel cell unit 12 and upstream of the branch of the exhaust gas return 38; downstream of the branch of the exhaust gas return 38 and upstream of the afterburner 42. It would also be conceivable to simultaneously control the volumetric flow at a plurality of these locations of the fuel cell device 10.

In the exemplary embodiment shown, additionally to the control of the fuel cell device 10, the natural gas volumetric flow as well as the volumetric flow $\dot{V}_r$ is also controlled with the same functional relationship.

With an additional determination of the density or of the molar mass $M_{NG}$ of the fuel, or of the natural gas, which is used, the mass flows can also be determined and correspondingly set analogously to the volumetric flows. The functional relationship, for example, between a mass flow $\dot{m}_r$ in the exhaust gas return 38 and said variables $K_{e^-}$, $\Phi$, $U_{f,S}$, I and $M_{NG}$ can be described as follows:

$$\dot{m}_r = f(U_{f,S}, \Phi, I, K_{e^-}, M_{NG})$$

Analogously to the volumetric flows, the mass flows at other locations of the fuel cell device 10, especially at locations of the anode-side flow guide of the fuel cell device 10, can be correspondingly also determined and correspondingly set exclusively in accordance with the certain electron configuration $K_{e^-}$, the certain molar mass $M_{NG}$ and the specified set points $\Phi$, $U_{f,S}$ and I. The same functional relationship as for the mass flow $\dot{m}_r$ in the exhaust gas return 38 is analogously present here.

Figure 2:
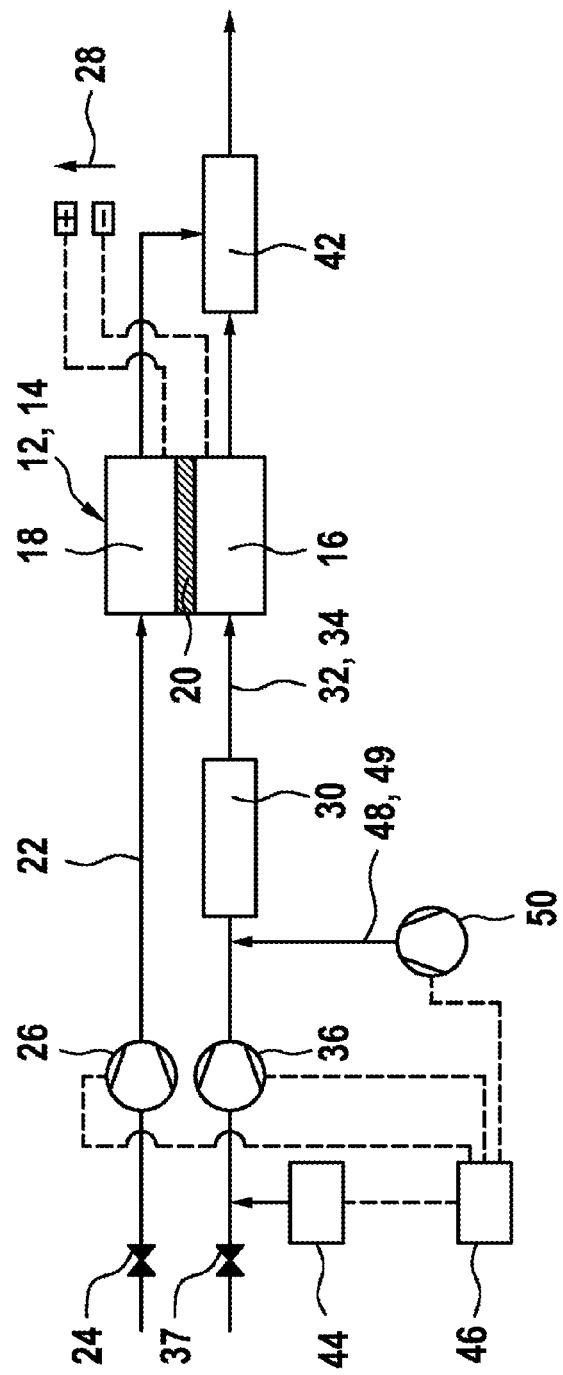
FIG. 2 shows a schematic illustration of a further exemplary embodiment of a fuel cell device.

FIG. 2 shows a schematic illustration of a further exemplary embodiment of a fuel cell device 10. In contrast to the exemplary embodiment shown in FIG. 1, the fuel cell device 10 in FIG. 2 has a water supply 48 or a water supply line 49 instead of an exhaust gas return 38, wherein a water supply rate $r_W$ is controlled in accordance with the quality variable $K_{e^-}$, or the electron configuration $K_{e^-}$, and the first, second and third set point $\Phi$, $U_{f,S}$ and I. Control also takes place here exclusively in accordance with said variables, and therefore the control of the fuel cell device 10 is simplified.

Correspondingly, a compressor 50, or pump, of the water supply 48 is controlled via its rotational speed in such a manner that the water supply rate $r_W$ is set. Correspondingly, it can also be understood by this as meaning that the volumetric flow $\dot{V}_W$ in the water supply 48 is determined and correspondingly set exclusively in accordance with the certain electron configuration $K_{e^-}$ and the specified set points $\Phi$, $U_{f,S}$ and I. The functional relationships of the volumetric flows and mass flows to said variables $K_{e^-}$, $\Phi$, $U_{f,S}$ and I can be described for the exemplary embodiment from FIG. 2 analogously to how they have already been described for the exemplary embodiment from FIG. 1.

The invention claimed is:

1. A method for operating a fuel cell device (10), the method comprising:
    operating the fuel cell device (10) via a controller (46) and in accordance with a quality characteristic of a fuel which is used,
    determining via the controller (46), and a detecting device (44), the quality characteristic from a partial analysis of constituents of the fuel which is used,
    determining via the controller (46) an electron configuration of the fuel which is used from the quality characteristic, and
    controlling via the controller (46) a compressor (40, 50) of the fuel cell device (10) using the electron configuration of the fuel which is used.

2. The method as claimed in claim 1, wherein the fuel cell device (10) has at least one reformer unit (30) and/or at least one fuel cell unit (12), wherein operating the fuel cell device (10) further comprises operating the at least one reformer unit (30) and/or the at least one fuel cell unit (12) depending on the quality characteristic of the fuel which is used.

3. The method as claimed in claim 1, wherein the quality characteristic corresponds to a number of potentially releasable electrons per molecule of the fuel which is used.

4. The method as claimed in claim 3, wherein the fuel cell device (10) has an exhaust gas return (38), wherein operating the fuel cell device further comprises: controlling an exhaust gas return rate ($r_A$) in accordance with the quality characteristic.

5. The method as claimed in claim 3, wherein the fuel cell device (10) has a water supply (48), wherein operating the fuel cell device further comprises: controlling a water supply rate ($r_w$) in accordance with the quality characteristic.

6. The method as claimed in claim 1, wherein operating the fuel cell device (10) further comprises: specifying one or more set points, wherein a first set point corresponds to a ratio ($\Phi$) between oxygen and carbon, a second set point corresponds to a fuel efficiency rating ($U_{f,S}$) and/or a third set point corresponds to an electrical current value (I).

7. method as claimed in claim 1, wherein the quality characteristic corresponds to the electron configuration ($K_{e^-}$).

8. The method as claimed in claim 7, wherein operating the fuel cell device (10) further comprises: specifying one or more set points, wherein a first set point corresponds to a ratio ($\Phi$) between oxygen and carbon, a second set point corresponds to a fuel efficiency rating ($U_{f,S}$) and/or a third set point corresponds to an electrical current value (I).

9. The method as claimed in claim 8, wherein the fuel cell device (10) has an exhaust gas return (38), wherein operating the fuel cell device further comprises: controlling an exhaust gas return rate ($r_A$) in accordance with the electron configuration ($K_{e^-}$) and in accordance with the first, second and/or third set point ($\Phi$, $U_{f,S}$, I).

10. The method as claimed in claim 8, wherein the fuel cell device (10) has a water supply (48), wherein operating the fuel cell device further comprises: controlling a water supply rate ($r_w$) in accordance with the electron configuration ($K_{e^-}$), and in accordance with the first, second and/or third set point ($\Phi$, $U_{f,S}$, I).

* * * * *